US008038063B2

(12) United States Patent
Lee

(10) Patent No.: US 8,038,063 B2
(45) Date of Patent: Oct. 18, 2011

(54) PORTABLE SECURITY PRINTED MATTER AUTHENTICATION DEVICE

(75) Inventor: Gu Youl Lee, Cheongju-si (KR)

(73) Assignee: M-Vision Co., Ltd., Chungcheongbuk-do (KR)

( * ) Notice: Subject to any disclaimer, the term of this patent is extended or adjusted under 35 U.S.C. 154(b) by 855 days.

(21) Appl. No.: 12/075,997

(22) Filed: Mar. 14, 2008

(65) Prior Publication Data

US 2008/0237350 A1 Oct. 2, 2008

(30) Foreign Application Priority Data

Mar. 15, 2007 (KR) ........................ 10-2007-0025650
Jul. 26, 2007 (KR) ........................ 10-2007-0075188

(51) Int. Cl.

| | |
|---|---|
| ***G06K 7/00*** | (2006.01) |
| ***G06K 9/00*** | (2006.01) |
| ***G06K 7/10*** | (2006.01) |
| ***G06K 7/14*** | (2006.01) |

(52) U.S. Cl. ................... 235/439; 235/462.01; 235/454; 382/100

(58) Field of Classification Search ............. 235/462.01, 235/439, 375, 454; 362/253, 154, 310; 382/100
See application file for complete search history.

(56) References Cited

U.S. PATENT DOCUMENTS

2001/0054644 A1* 12/2001 Liang ............................ 235/454
2004/0141320 A1* 7/2004 Bock et al. ..................... 362/253
2004/0217173 A1* 11/2004 Lizotte et al. ............ 235/462.01
2004/0264737 A1* 12/2004 Alasia et al. .................. 382/100

* cited by examiner

*Primary Examiner* — Thien Mai
(74) *Attorney, Agent, or Firm* — Intellectual Property Law Group LLP; Juneko Jackson

(57) ABSTRACT

Provided is a portable security printed matter authentication device for authenticating security codes printed on security printed matter such as currency, vouchers, passports, and identification cards. The portable security printed matter authentication device includes: a housing including an observation hole at a top portion of the housing; a magnifying lens disposed to be close to the observation hole inside the housing; an optical filter disposed below the magnifying lens; and a plurality of LED (light-emitting diode) lamps which are disposed below the optical filter and illuminate light toward the security printed matter, wherein the LED lamps are a combination of two or more types of ultraviolet (UV) LED lamps, color LED lamps, and infrared (IR) lamps.

6 Claims, 6 Drawing Sheets
(3 of 6 Drawing Sheet(s) Filed in Color)

[FIG. 4A]
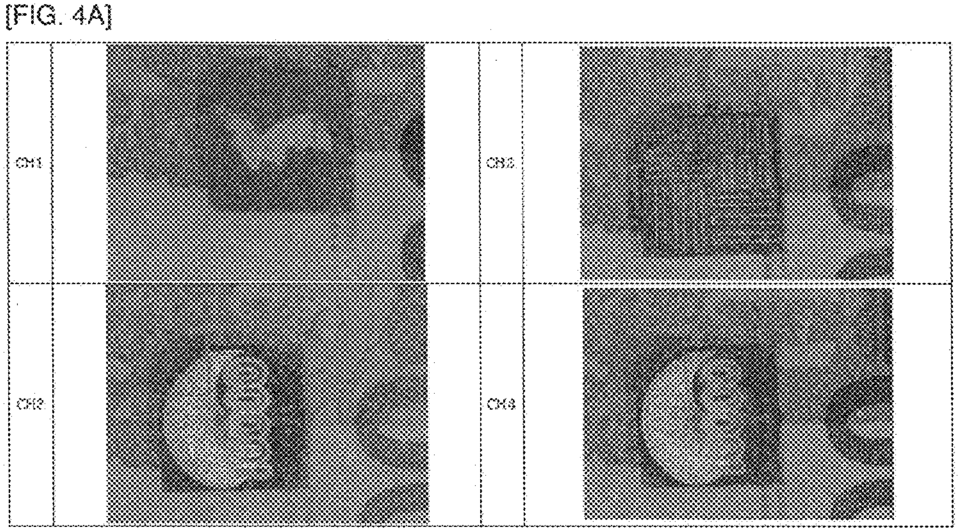
[FIG. 4B]
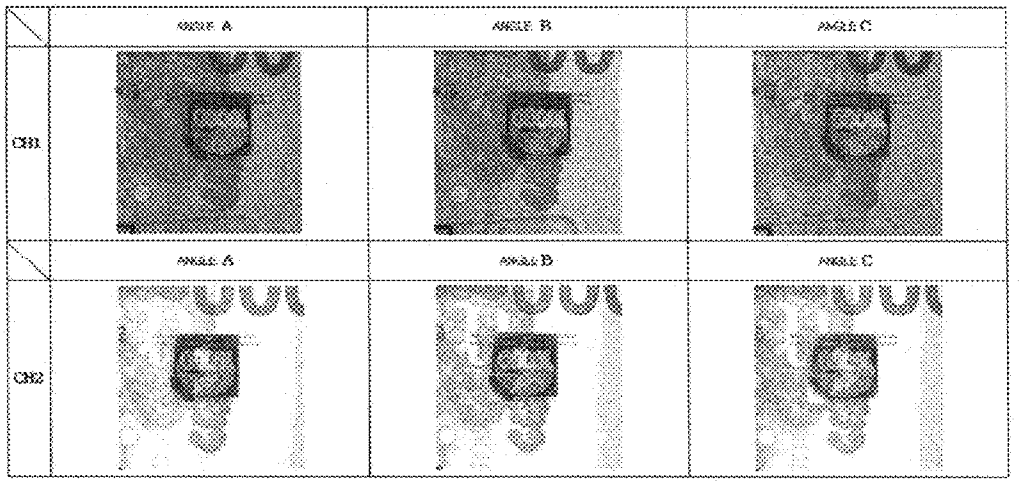

[FIG. 5]
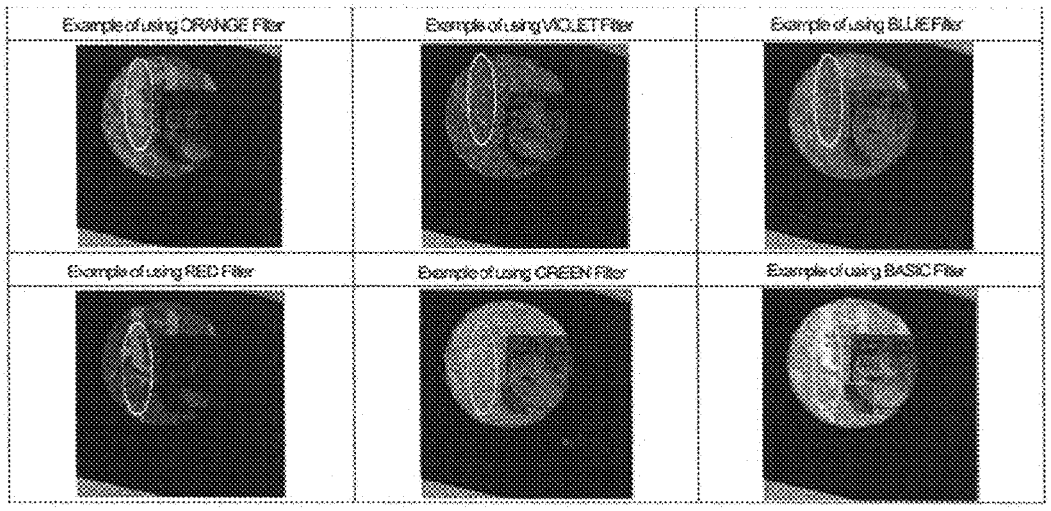
[FIG. 6]
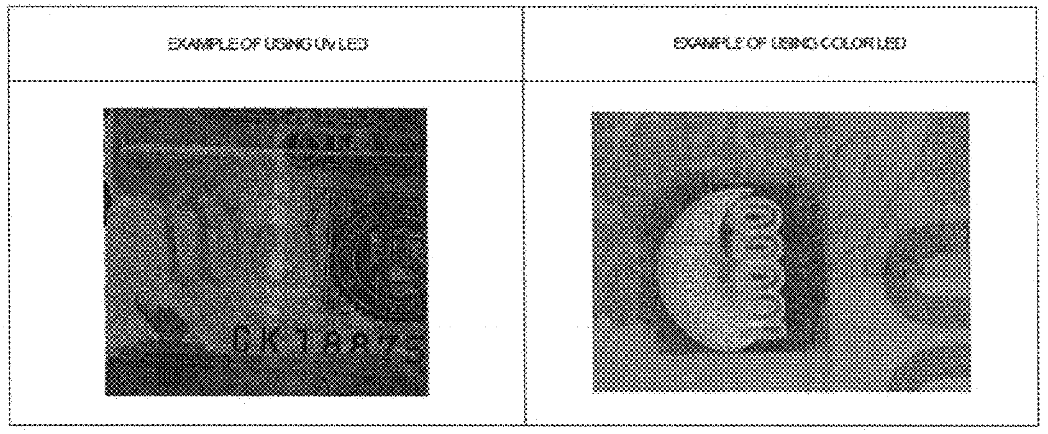

[FIG. 7]
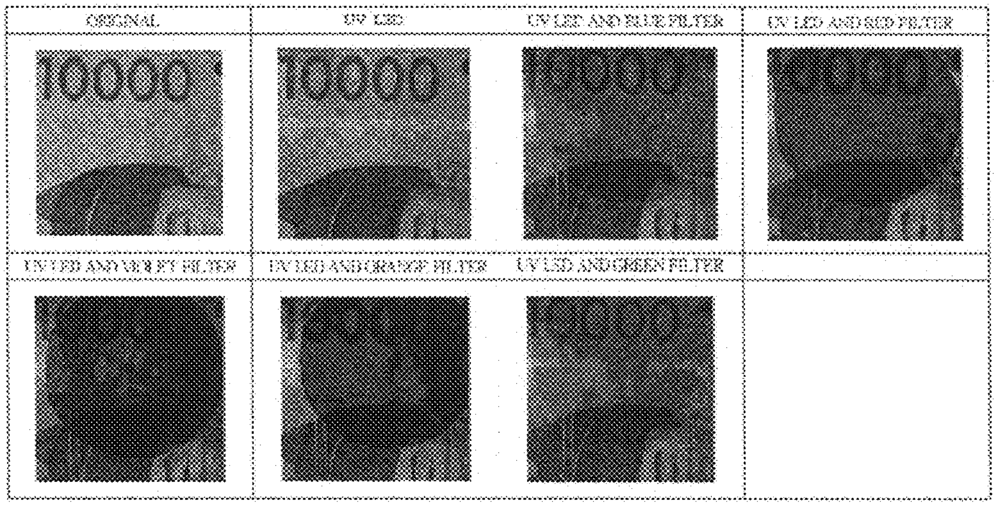

PORTABLE SECURITY PRINTED MATTER AUTHENTICATION DEVICE

CROSS-REFERENCE TO RELATED APPLICATIONS

This application claims the benefit of Korean Patent Application No. 10-2007-0025650, filed on Mar. 15, 2007, and Korean Patent Application No. 10-2007-0075188, filed on Jul. 26, 2007, the entire contents of which are hereby incorporated by reference.

BACKGROUND OF THE INVENTION

1. Field of the Invention

The present invention relates to a security printed matter authentication device which authenticates security codes formed on currency or printed matter for authentication, and more particularly, to a portable security printed matter authentication device which is portable, can be easily used, and can authenticate security codes in various types.

2. Description of the Related Art

In general, security codes are printed on printed matter such as currency, vouchers, identification cards, passports, and the like for anti-counterfeiting. The security codes are printed generally by using inks including fluorescent materials, holograms, microprinting, or the like.

As a device for authenticating the security codes, a conventional security printed matter authentication device uses a reflecting plate for reflecting an ultraviolet (UV) light source generated by a UV fluorescent lamp, the light reflected by the reflecting plate is projected onto an object, and the security printed matter authentication device reads light reflected from the object.

However, a size of the security printed matter authentication device inevitably increases due to a construction including the UV fluorescent lamp and the reflecting plate. Therefore, shops using currency or vouchers hardly have the security printed matter authentication devices, so that there is a problem in that the permeation of the authentication devices in the shops is difficult.

In addition, as counterfeiting techniques have been developed, methods of printing the security codes have been diversified. However, the conventional security printed matter authentication device can use only predetermined authentication techniques such as a technique using the UV fluorescent lamp or a technique selectively detecting a particular range of visible radiation, so that the conventional security printed matter authentication device cannot be compatible with other media applying a new security code printing method.

Accordingly, there is a problem in that a number of security printed matter authentication devices have to be provided according to a type of the security printed matter to be authenticated.

SUMMARY OF THE INVENTION

The present invention provides a portable security printed matter authentication device which is implemented to be compact and portable so as to be easily used and accurately authenticate security codes in various types.

Objects of the present invention are not limited thereto, and other objects that are not mentioned above can be understood by those of ordinary skill in the art by the following description.

According to an aspect of the present invention, there is provided a portable security printed matter authentication device for authenticating security codes printed on security printed matter such as currency, vouchers, passports, and identification cards, including: a housing including an observation hole at a top portion of the housing; a magnifying lens disposed to be close to the observation hole inside the housing; an optical filter disposed below the magnifying lens; and a plurality of LED (light-emitting diode) lamps which are disposed below the optical filter and illuminate light toward the security printed matter, wherein the LED lamps are a combination of two or more types of ultraviolet (UV) LED lamps, color LED lamps, and infrared (IR) lamps.

In the above aspect of the present invention, the LED lamps may include the UV LED lamps and the color LED lamps, and each of the UV LED lamps and the color LED lamps may be selectively turned on or off by a user. In this case, the optical filter may be designed to have a color corresponding to a color of light illuminated by the color LED lamp.

In addition, the color LED lamps may be a combination of color LED lamps having various colors, and one or more of the color LED lamps may be selectively turned on or off by manipulation of the user.

In addition, the housing may include: an optical filter inserting unit which is formed at a side portion of the housing and through which the optical filter is inserted to be detachable; and a fixing slot fixing a position of the optical filter inserted through the optical filter inserting unit, and wherein the optical filter is replaced through the optical filter inserting unit by the user.

In addition, a plurality of the LED lamps may be arranged in a dome shape or a double annular shape.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the present invention will become more apparent by describing in detail exemplary embodiments thereof with reference to the attached drawings in which:

FIGS. 4A and 4B are pictures of objects to be authenticated taken by using the portable security printed matter authentication device according to the embodiment of the present invention; and FIGS. 5 to 7 are pictures of objects to be authenticated taken by using various combinations of selected optical filters and LEDs of the portable security printed matter authentication device according to the embodiment of the present invention.

DETAILED DESCRIPTION OF THE INVENTION

Figure 1:
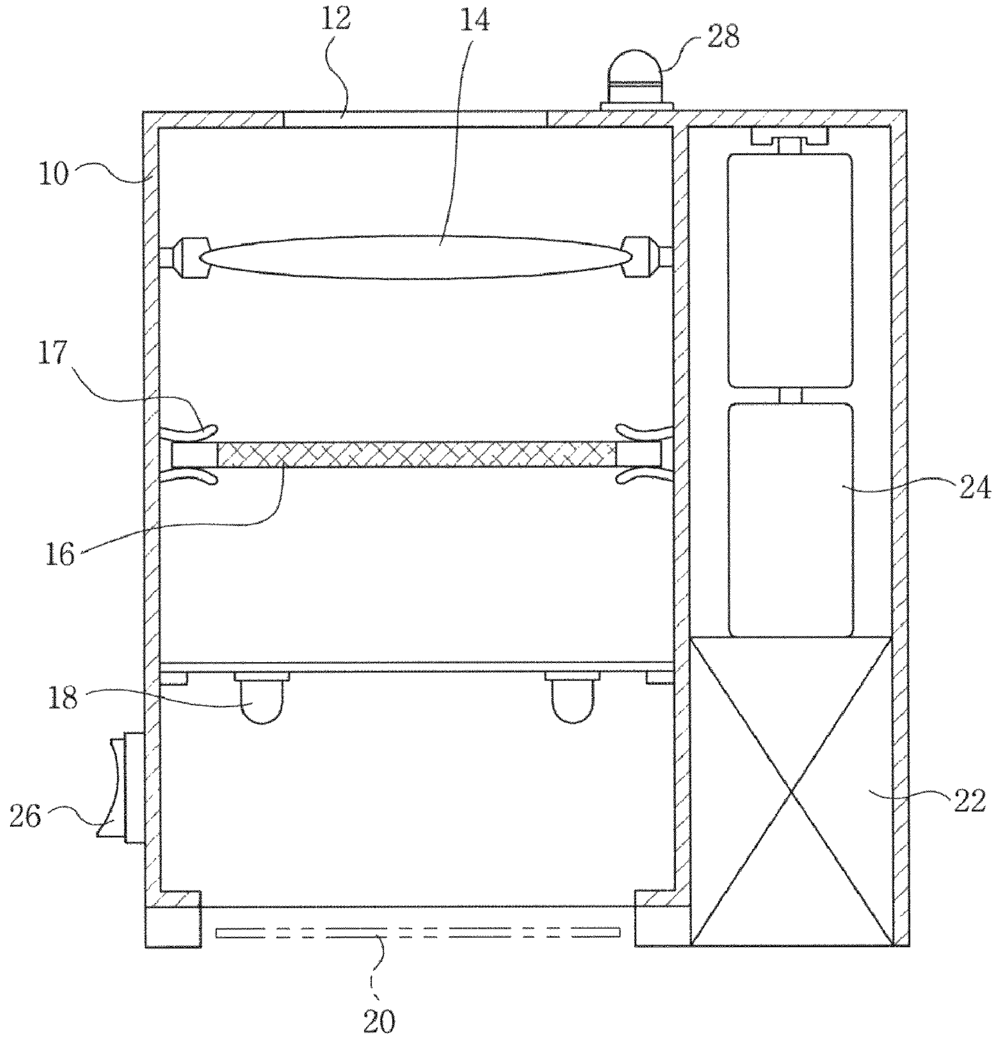
FIG. 1 is a cross-sectional view illustrating a portable security printed matter authentication device according to an embodiment of the present invention.

A portable security printed matter authentication device for authenticating security codes printed on security printed matter such as currency, vouchers, passports, and identification cards according to embodiments of the present invention includes: a housing including an observation hole at a top portion of the housing; a magnifying lens disposed to be close to the observation hole inside the housing; an optical filter disposed below the magnifying lens; and a plurality of LED (light-emitting diode) lamps which are disposed below the optical filter and illuminate light toward the security printed matter, wherein the LED lamps are a combination of two or more types of ultraviolet (UV) LED lamps, color LED lamps, and infrared (IR) lamps.

In the above aspect of the present invention, the LED lamps may include the UV LED lamps and the color LED lamps, and each of the UV LED lamps and the color LED lamps may be selectively turned on or off by a user. In this case, the optical filter may be designed to have a color corresponding to a color of light illuminated by the color LED lamp.

In addition, the color LED lamps may be a combination of color LED lamps having various colors, and one or more of the color LED lamps may be selectively turned on or off by manipulation of the user.

In addition, the housing may include: an optical filter inserting unit which is formed at a side portion of the housing and through which the optical filter is inserted to be detachable; and a fixing slot fixing a position of the optical filter inserted through the optical filter inserting unit, and wherein the optical filter is replaced through the optical filter inserting unit by the user.

In addition, a plurality of the LED lamps may be arranged in a dome shape or a double annular shape.

Details of exemplary embodiments are included in the specification and attached drawings.

Advantages, features, and methods of accomplishing the advantages and features of the present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements.

Hereinafter, exemplary embodiments of the present invention will be described in detail with reference to the attached drawings.

FIG. 1 is a cross-sectional view illustrating a portable security printed matter authentication device according to an embodiment of the present invention. Referring to FIG. 1, the portable security printed matter authentication device includes a housing 10 substantially in a box shape in which components are included in order to increase portability.

Although the housing 10 is in the hexahedral box shape in FIG. 1, it will be understood by those of ordinary skill in the art that the box shape of the housing 10 applied to the portable security printed matter authentication device can be modified in various manners.

At a top portion of the housing 10, an observation hole 12 through which an inspector can inspect an object 20 to be authenticated with the naked eye is formed.

Inside the housing 10, a magnifying lens 14 is disposed to be close to the observation hole 12, and below the magnifying lens 14, an optical filter 16 and LED lamps 18 are disposed. A bottom portion of the housing 10 is open, and the object 20 to be authenticated is disposed under the open bottom portion.

The object 20 to be authenticated according to the embodiment of the present invention means any type of security printed matter having printed security codes such as currency, vouchers, identification cards, passports, and the like.

The LED lamps 18 are disposed to face the object 20. The LED lamps 18 may be a combination of UV LEDs, color LEDs, and IR LEDs, and more preferably, a combination of two or more of the UV LEDs, the color LEDs, and the IR LEDs.

Light illuminated by the LED lamps 18 is reflected by the object 20 and filtered by the optical filter 16. The light filtered by the optical filter 16 is magnified by the magnifying lens 14, and the inspector can read the magnified light through the observation hole 12.

The portable security printed matter authentication device according to the embodiment of the present invention may include a portable power supply such as a battery at a side of the housing 10 in order to increase portability.

The power is supplied from the battery 24 to an LED driving unit 22, and a switch 26 provided to an external surface of the housing 10 is manipulated to enable the LED driving unit 22 to drive the LED lamps 18 disposed inside the housing 10. An indicator lamp 28 may be mounted on the housing 10 to indicate an operation status.

Here, the portable power supply employed according to the embodiment of the present invention may be replaced with a charger instead of the battery 24. In this case, it will be understood that as a charging method, any charging method such as well-known wire charging methods or wireless charging methods can be applied. In addition, it will be understood by those of ordinary skill in the art that the power supply of the portable security printed matter authentication device includes an adaptor connector, and an alternate current voltage is rectified by an adaptor to be supplied to the LED driving unit 22.

In addition, although not shown in the figure, an external handle may be provided to the portable security printed matter authentication device for portability.

Figure 2:
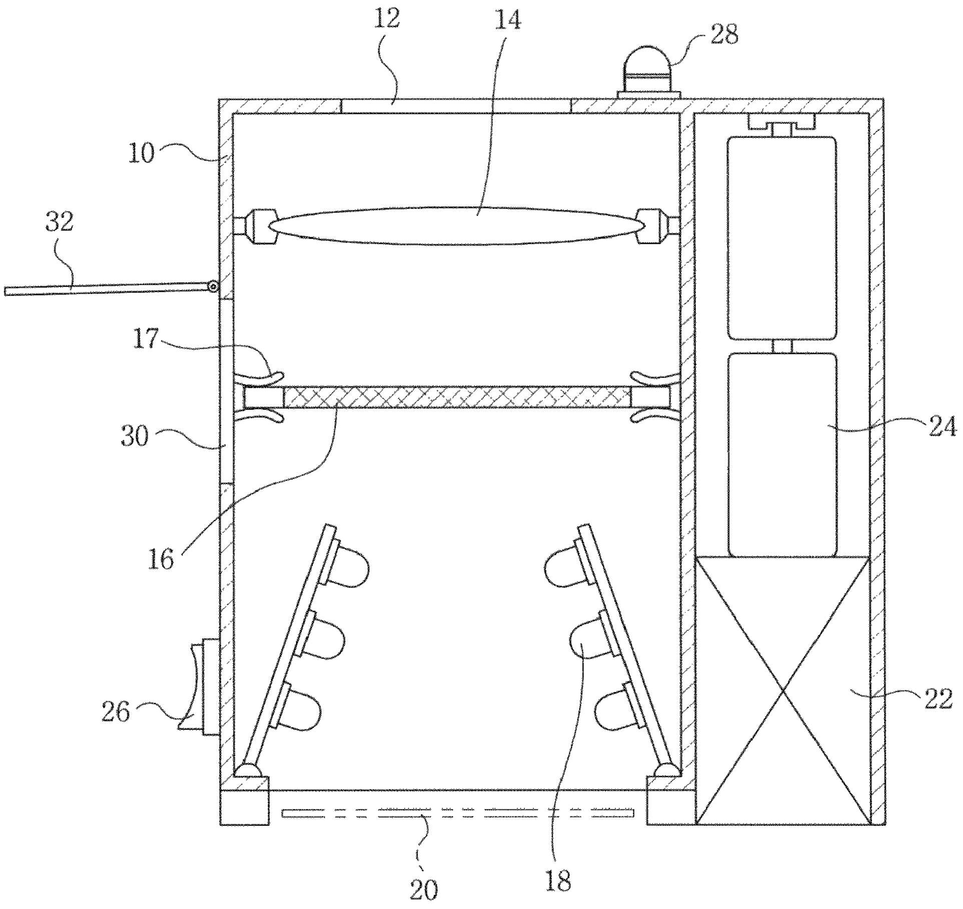
FIG. 2 is a cross-sectional view illustrating a portable security printed matter authentication device according to another embodiment of the present invention.

FIG. 2 is a cross-sectional view illustrating a portable security printed matter authentication device according to another embodiment of the present invention.

Referring to FIG. 2, the portable security printed matter authentication device according to the current embodiment of the present invention further includes an optical filter inserting unit 30 which is formed at a side portion of the housing 10 and through which the optical filter 16 is inserted to be detachable in order to selectively use various optical filters 16, and a fixing slot 17 which is disposed inside the housing 10 to fix a position of the inserted optical filter 16.

Here, in order to prevent light from leaking after the optical filter 16 is inserted and fixed inside the housing 10, the optical filter inserting unit 30 is covered by a cover 32 which is hinged at the side portion of the housing 10.

In other words, the portable security printed matter authentication device according to the current embodiment of the present invention may include various LED lamps 18 such as the UV LEDs, the color LEDs, the IR LEDs, and the like, and in this case, each of the LED lamps 18 is designed to be selectively turned on and off according to a type of each of the LED lamps 18. Here, in order to increase accuracy of authentication and apply the portable security printed matter authentication device to various security codes, the optical filter 16 can be selectively replaced by a user.

Figure 3:
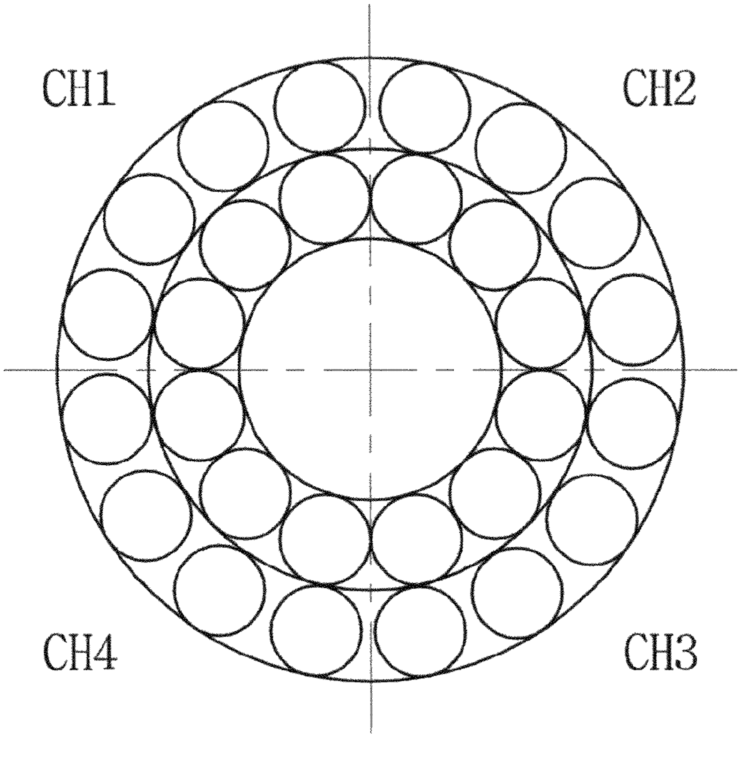
FIG. 3 is a view illustrating an example of an arrangement of light-emitting diode (LED) lamps provided to the portable security printed matter authentication device according to the embodiment of the present invention.

An arrangement of the LED lamps 18 applied according to the embodiment of the present invention may have a hollow rectangle shape, an annular shape, or the like in which the center portion is open so that the light reflected by the object 20 to be authenticated can be observed. In FIG. 3, an arrangement having a double annular shape is illustrated.

Referring to FIG. 3, a plurality of the LED lamps 18 can be divided into a plurality of channels by arbitrary virtual lines. For example, the UV LEDs form a first channel CH1, and other color LEDs form second to fourth channels CH2 to CH4. As described above, the LED lamps 18 are arranged to be divided into the channels, so that an advantage in that a specific light can be illuminated at a specific angle can be obtained. Images of the light reflected by the object 20 to be authenticated taken by illuminating light though the LED lamps 18 divided into the channels are illustrated in FIG. 4A.

Unlike in the figure, when the arrangement of the LED lamps 18 is formed to have a 3D shape such as a dome, there is an advantage in that various illumination directions and illumination angles of the LED lamps 18 can be selected. Images of the light reflected by the object 20 to be authenticated taken by varying illumination angles of the LED lamps 18 are illustrated in FIG. 4B.

However, it should be noted that the arrangement of the LED lamps 18 is not limited to the above-mentioned arrangements.

FIGS. 5 to 7 are pictures of objects to be authenticated taken by using various combinations of selected optical filters and LEDs of the portable security printed matter authentication device according to the embodiment of the present invention.

As described above, the portable security printed matter authentication device according to the embodiment of the present invention can selectively turn on and off each the lamps of a combination of the LED lamps 18 selected by a user. In addition, the optical filter 16 can be selectively replaced according to circumstances. FIGS. 5 to 7 illustrate pictures of portions of objects to be authenticated taken by using selected combinations of the LED lamps 18.

Referring to FIG. 5, as compared with a case where no optical filter 16 is employed, in a case where a green or blue optical filter 16 is employed, authentication can be easily performed. In other words, optical filters 16 that are applicable to certain circumstances such as a color or a material of the object 20 to be authenticated and a color or a type of lighting can be selected. Therefore, by applying the portable security printed matter authentication device according to the embodiment of the present invention illustrated in FIG. 2, various types of the optical filters 16 having various color characteristics can be selectively applied to provide utility.

In addition, as described above, the portable security printed matter authentication device according to the embodiment of the present invention includes a combination of the UV LEDs, the color LEDs, and the IR LEDs of the LED lamps 18, and each of the LED lamps 18 can be selectively turned on and off by manipulation of the user. Pictures of the object 20 to be authenticated taken by selectively turning on and off each of the LEDs and pictures of an object to be authenticated taken by applying the selected LED lamps and the selected optical filter 16 are illustrated in FIGS. 6 and 7, respectively.

Accordingly, the portable security printed matter authentication device according to the embodiment of the present invention can be implemented to have an ability to optimally authenticate an object to be authenticated according to a state of the object to be authenticated or circumstances. In addition, the LED lamps and the optical filters can be selected to have various combinations, so that more accurate authentication can be performed against counterfeiting in various manners.

In addition, the portable security printed matter authentication device according to the embodiment of the present invention may include a power supply such as a battery so as to be portable, and as described above, may further include an additional unit such as a handle.

The portable security printed matter authentication device includes the housing in which the LED lamps are disposed, the optical filter which filters light reflected from an object to be authenticated, and the magnifying lens for magnifying the filtered light to be observed by a user with the naked eye, so that a compact size of the portable security printed matter authentication device can be implemented. In addition, anyone can easily inspect the light filtered by the optical filter with the naked eye for authentication.

In addition, the UV LED lamps and the color LED lamps are selected to be arranged, and the LED lamps are divided into a plurality of channels. In addition, illumination angles can be varied. Therefore, the portable security printed matter authentication device can be used for various security codes such as holograms.

In addition, various LED lamps and optical filters can be selected and applied to significantly increase an ability to authenticate security codes printed on security printed matter such as currency.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. All differences within the scope of the invention will be construed as being included in the present invention.

What is claimed is:

1. A portable security printed matter authentication device for authenticating security codes printed on security printed matter including currency, vouchers, passports, and identification cards, comprising:

- a housing including an observation hole at a top portion of the housing;
- a magnifying lens disposed to be close to the observation hole inside the housing;
- an optical filter disposed below the magnifying lens and disposed above the security printed matter that is inserted at a bottom portion of the housing, the optical filter continuously spanning along an entire length inside the housing across a length of the bottom portion; and
- a plurality of LED (light-emitting diode) lamps arranged in a dome shape, which are disposed below the optical filter, while disposed above and facing the security printed matter such that the plurality of LED lamps reside between the optical filter and the printed matter to illuminate light toward the security printed matter beneath the LED lamps, wherein the LED lamps are a combination of two or more types of UV (ultraviolet) LED lamps, color LED lamps, and IR (infrared) lamps.

2. The device of claim 1,

- wherein the LED lamps comprise the UV LED lamps and the color LED lamps, and
- wherein each of the UV LED lamps and the color LED lamps is selectively turned on or off by a user.

3. The device of claim 2, wherein the optical filter is designed to have a color corresponding to a color of light illuminated by the color LED lamp.

4. The device of claim 2,

- wherein the color LED lamps are a combination of color LED lamps having various colors, and
- wherein one or more of the color LED lamps are selectively turned on or off by manipulation of the user.

5. The device of claim 4, wherein the housing comprises:

- an optical filter inserting unit which is formed at a side portion of the housing and through which the optical filter is inserted to be detachable; and
- a fixing slot fixing a position of the optical filter inserted through the optical filter inserting unit, and
- wherein the optical filter is replaced through the optical filter inserting unit by the user.

6. The device of claim 1, wherein a plurality of the LED lamps are arranged in a double annular shape.

* * * * *